July 14, 1925.
F. M. PETERS ET AL
1,545,513
MACHINE FOR MOLDING AND WRAPPING PLASTIC AND ANALOGOUS MATERIAL
Original Filed March 24, 1917   11 Sheets-Sheet 7
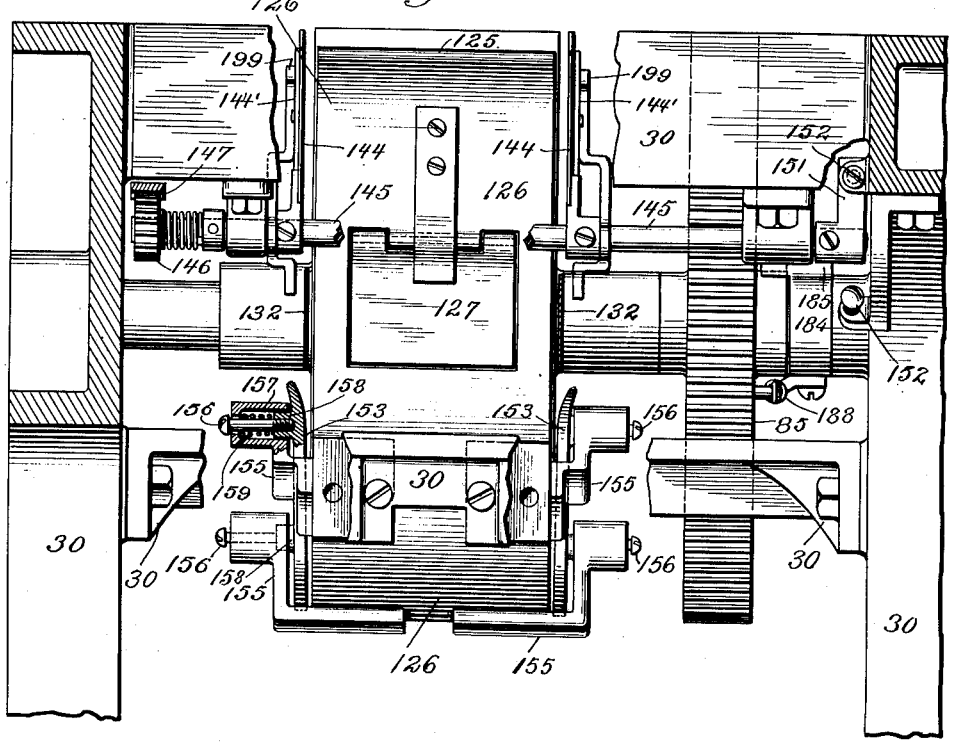
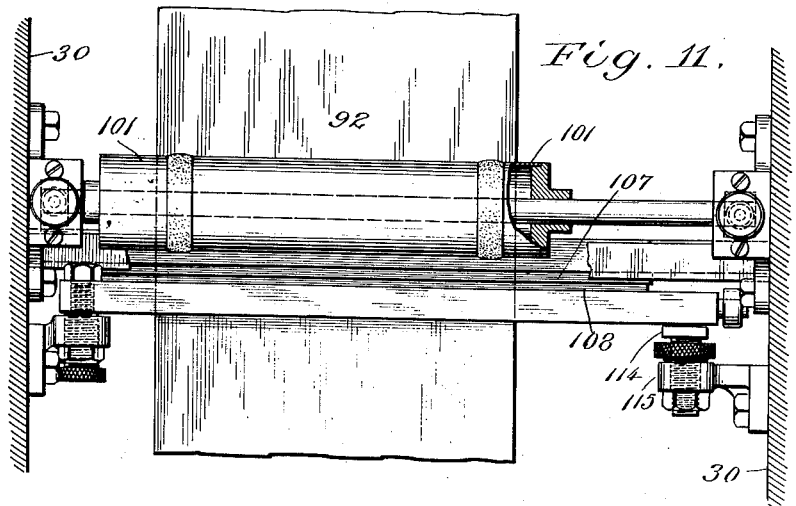
Inventors
Frank M. Peters and
Warren H. Hungerford
BY Conrad A. Dieterich
their ATTORNEY.

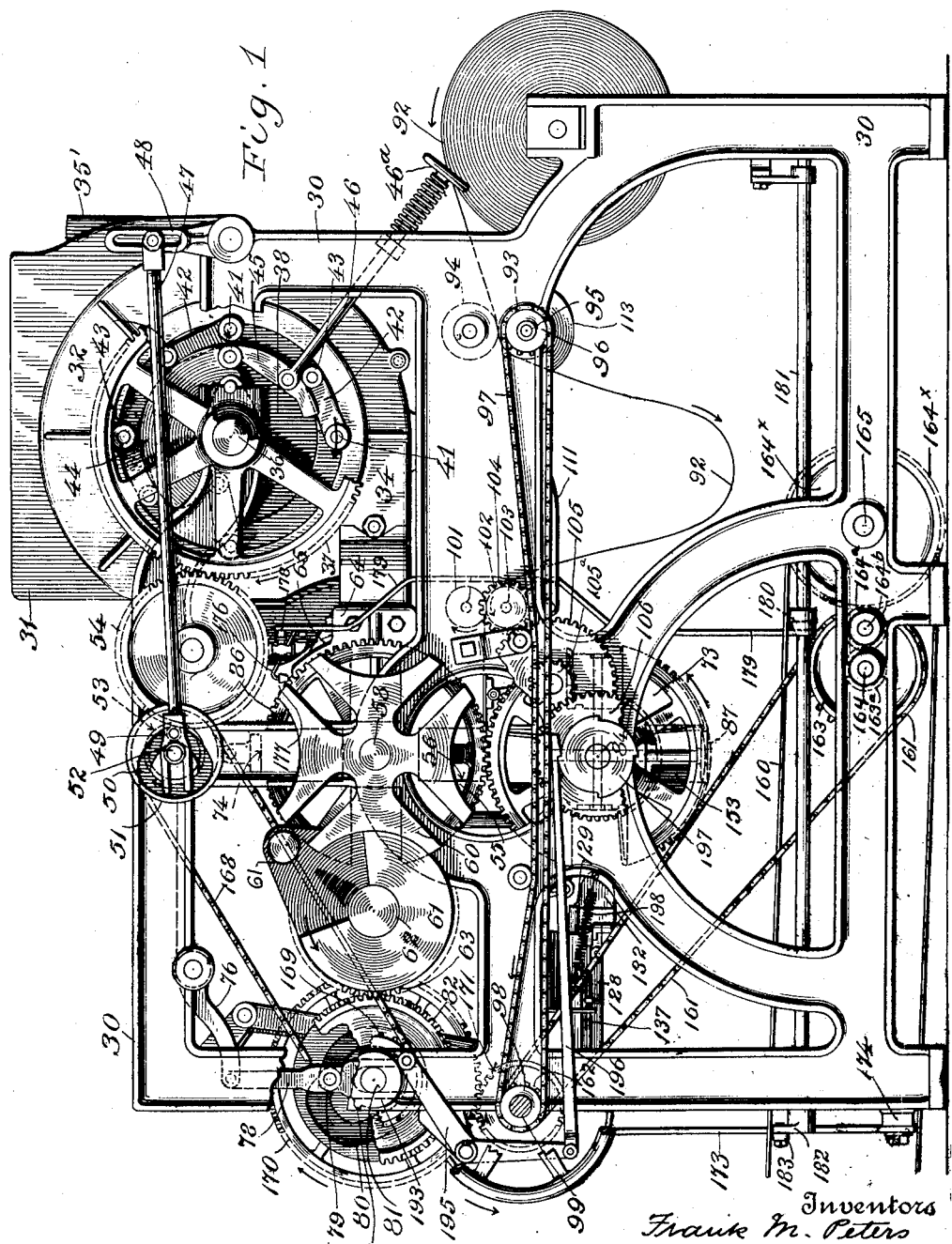

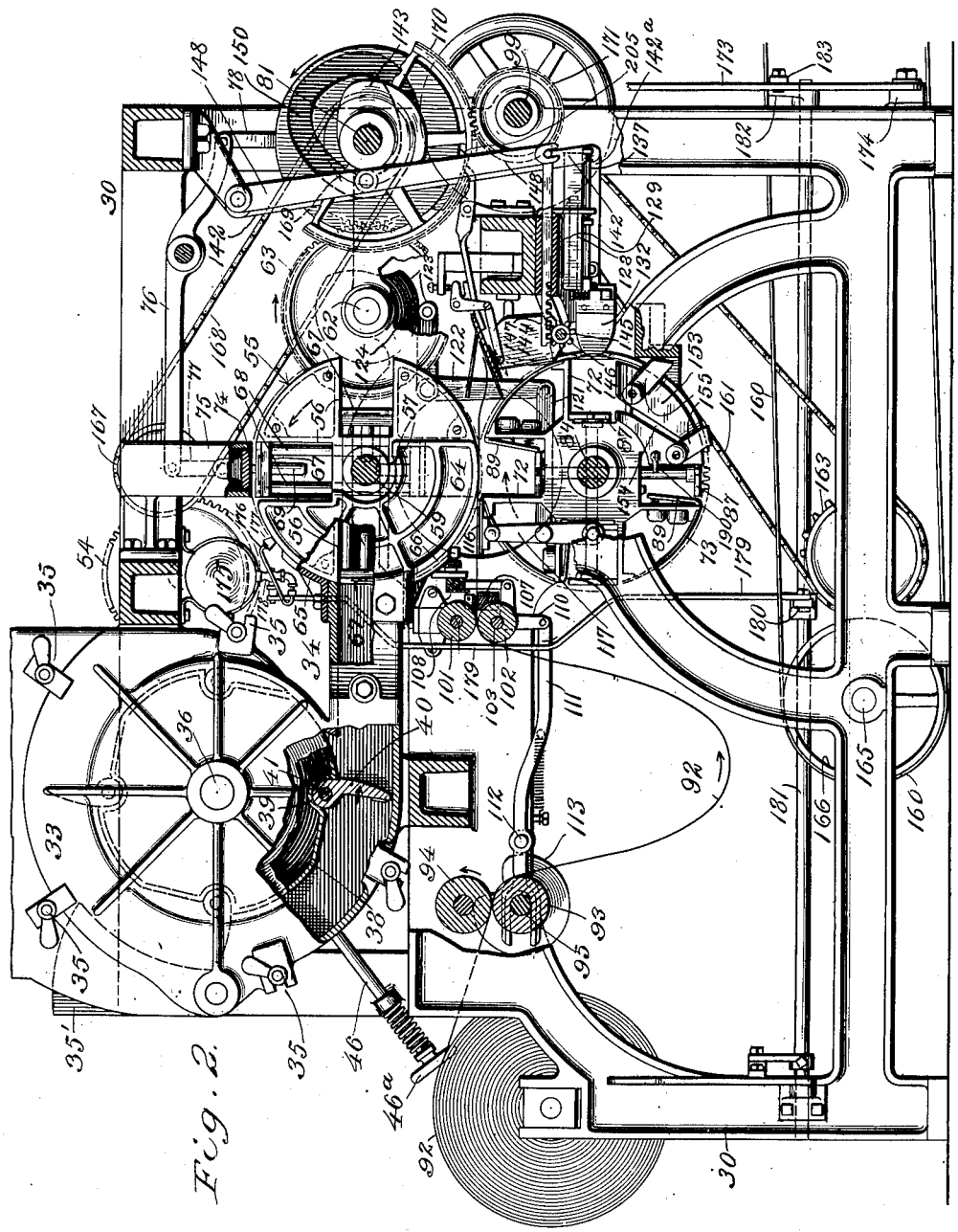

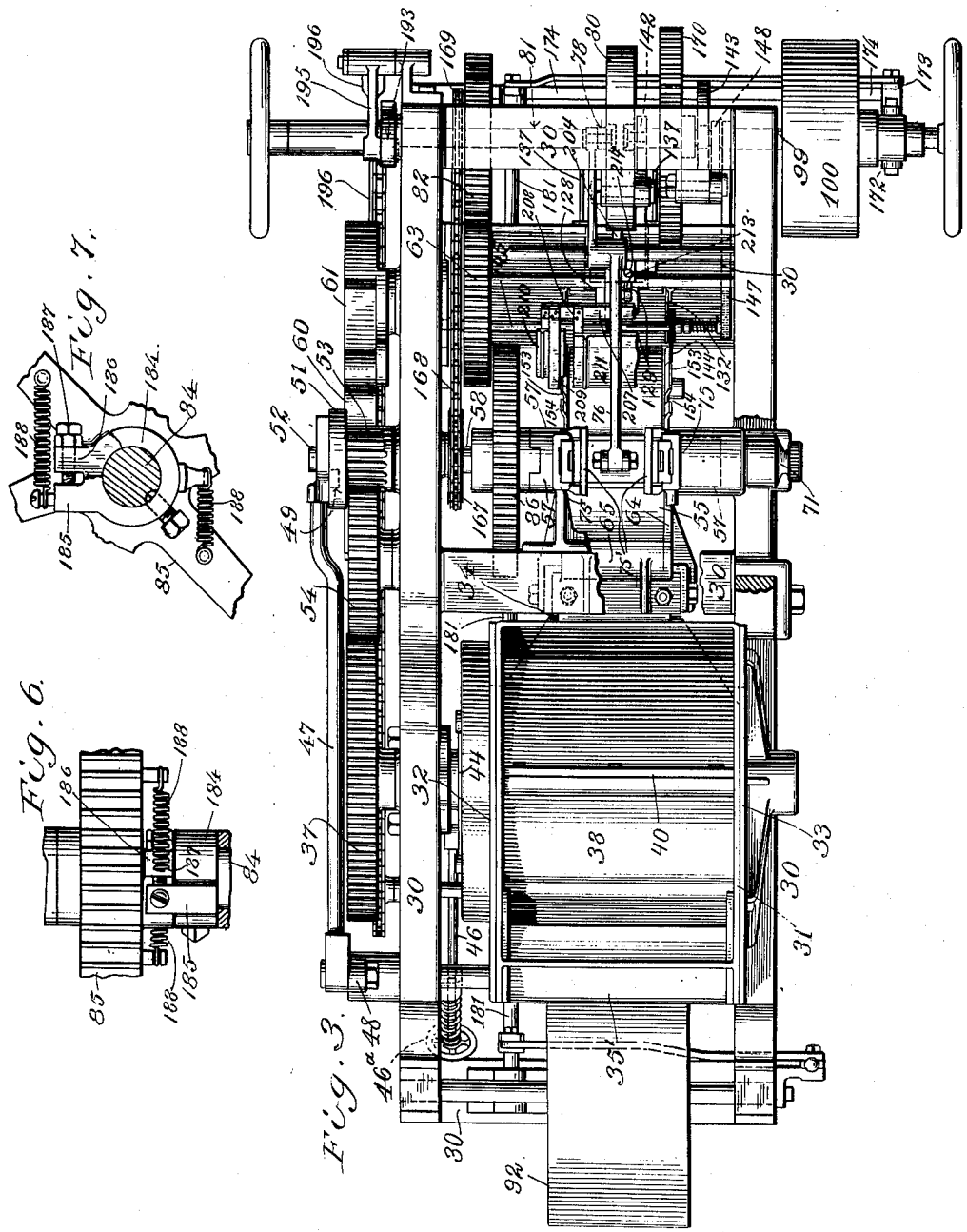

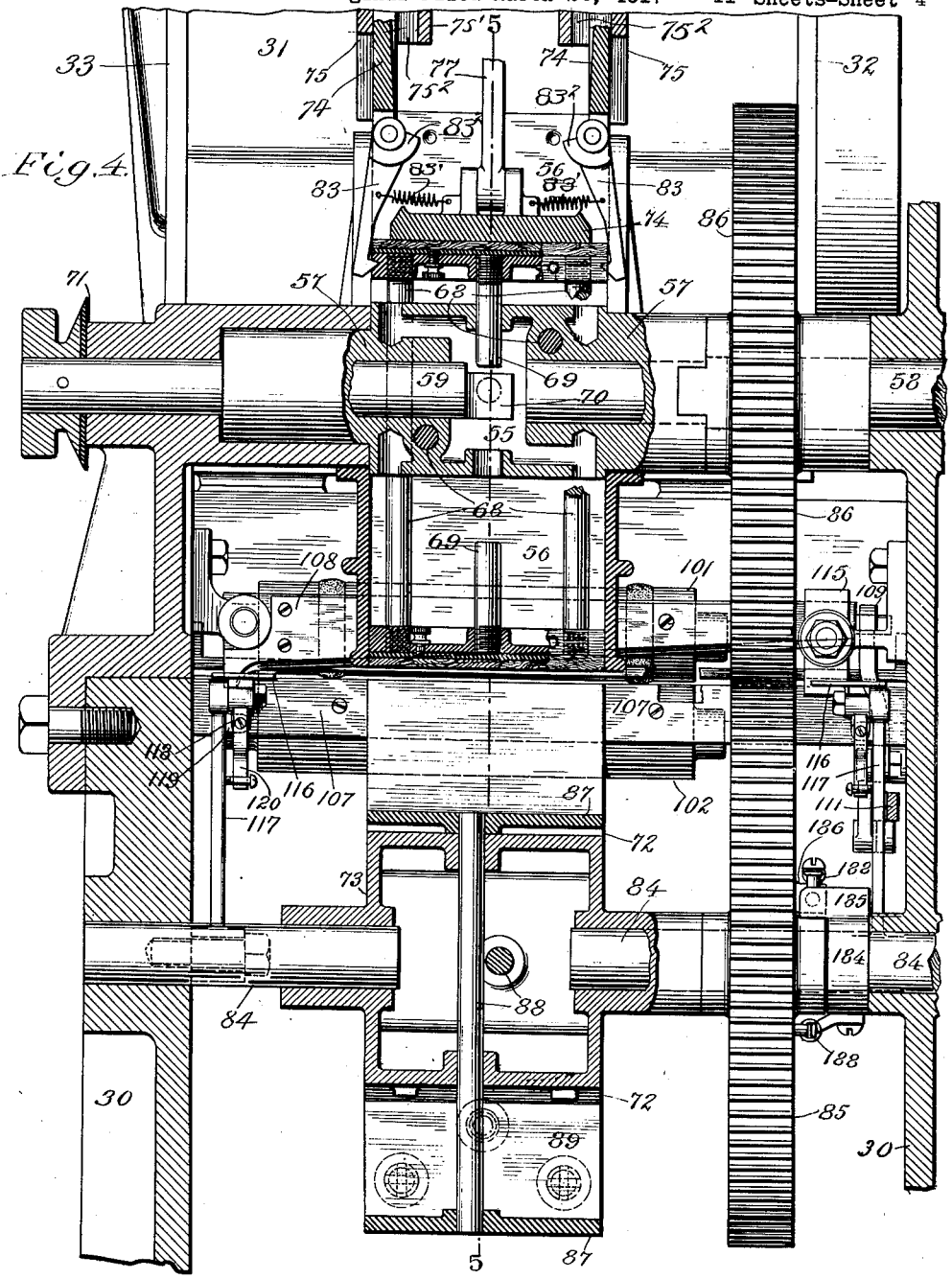

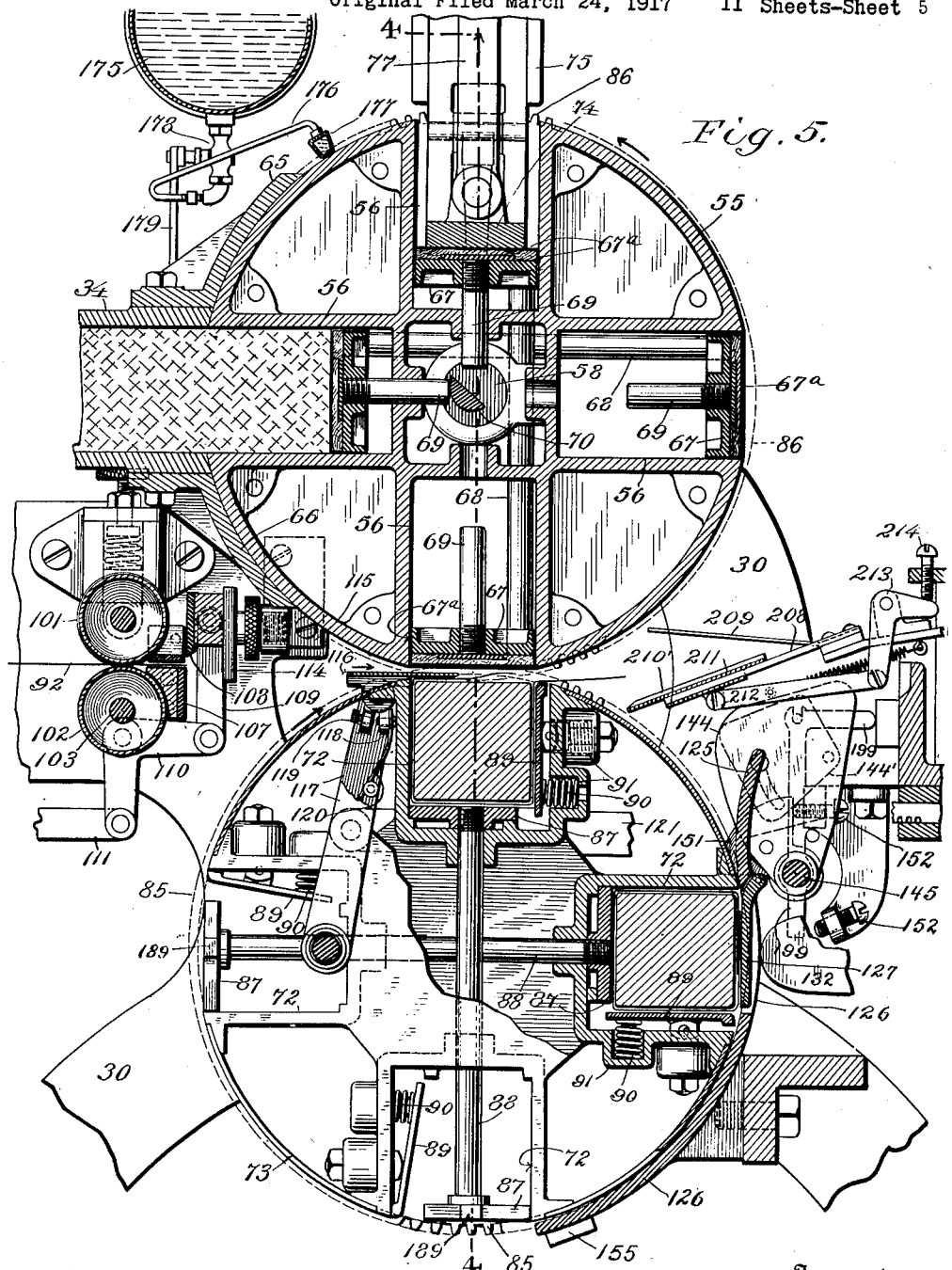

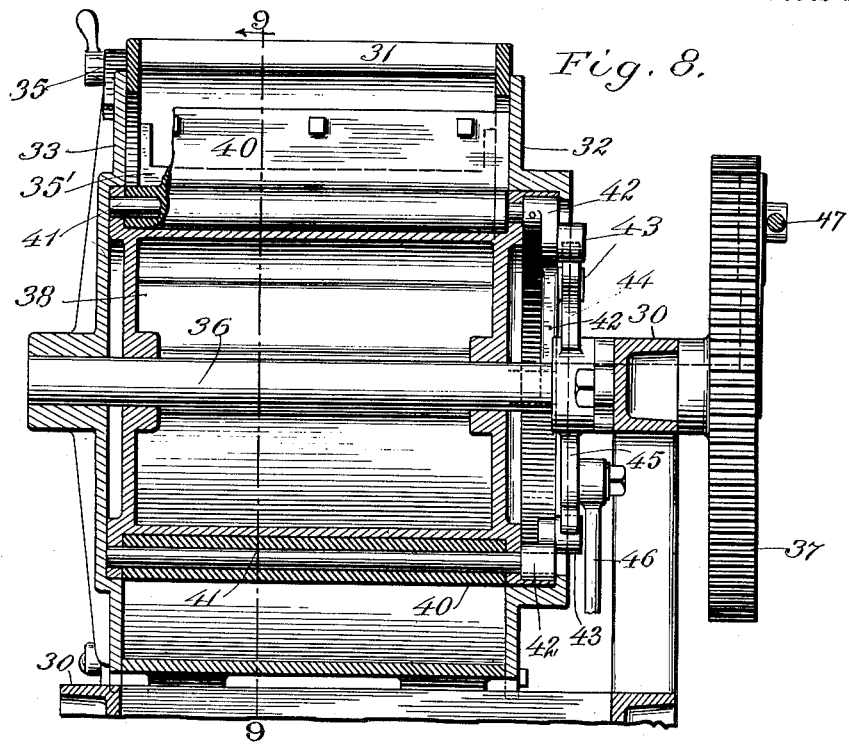

July 14, 1925.  
F. M. PETERS ET AL  
1,545,513  
MACHINE FOR MOLDING AND WRAPPING PLASTIC AND ANALOGOUS MATERIAL  
Original Filed March 24, 1917    11 Sheets-Sheet 8
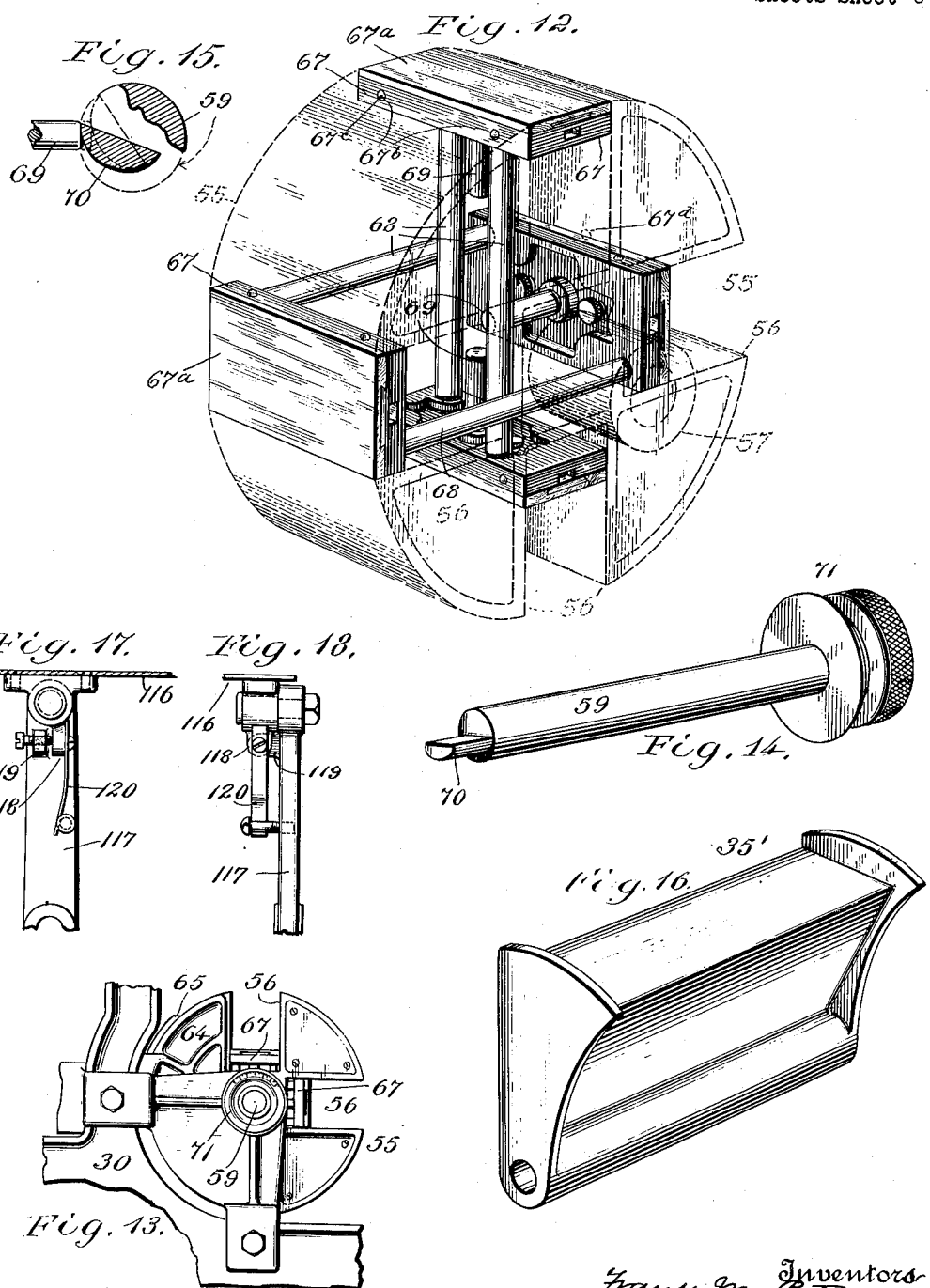

July 14, 1925.
F. M. PETERS ET AL
MACHINE FOR MOLDING AND WRAPPING PLASTIC AND ANALOGOUS MATERIAL
Original Filed March 24, 1917 11 Sheets-Sheet 9
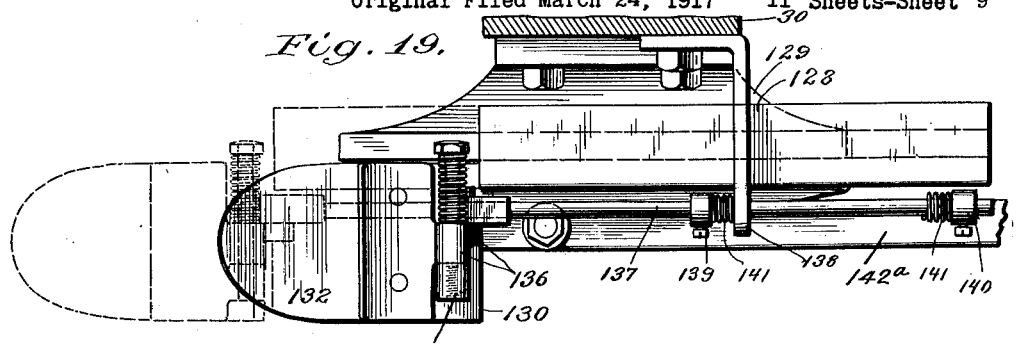
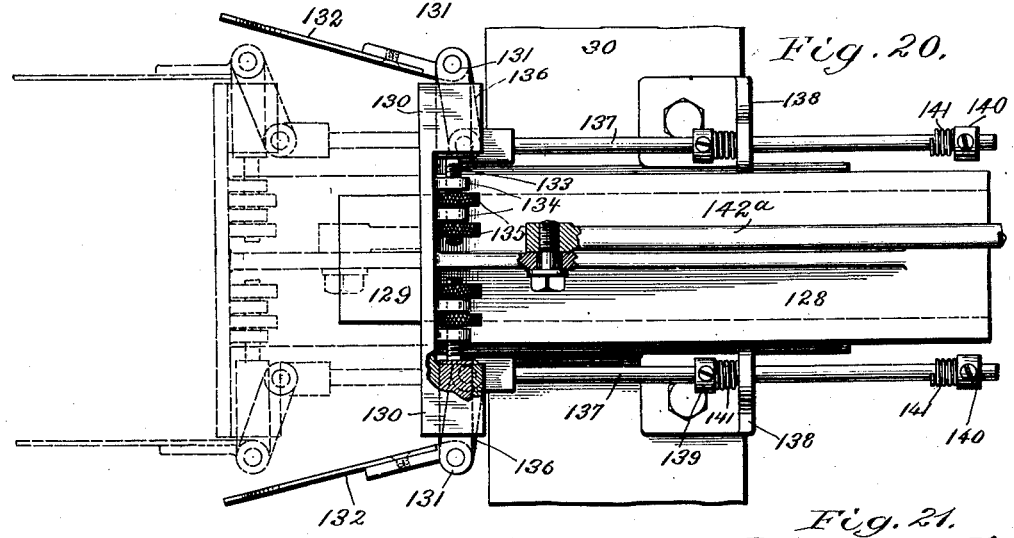
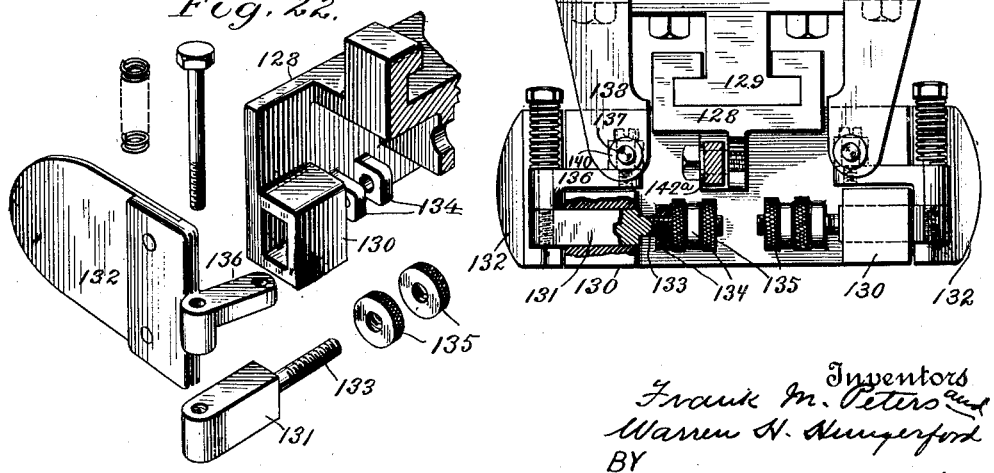
Inventors
Frank M. Peters and
Warren H. Hungerford
BY
Conrad A. Dieterich
their ATTORNEY.

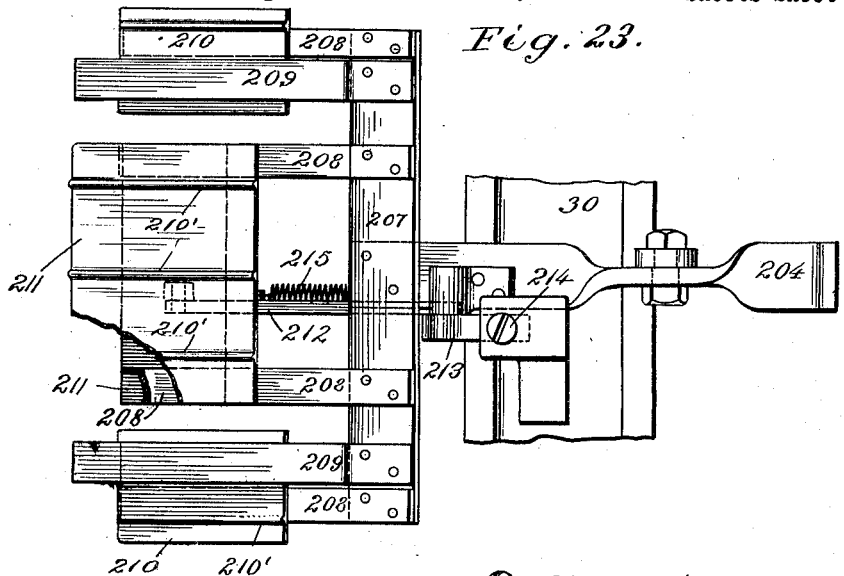
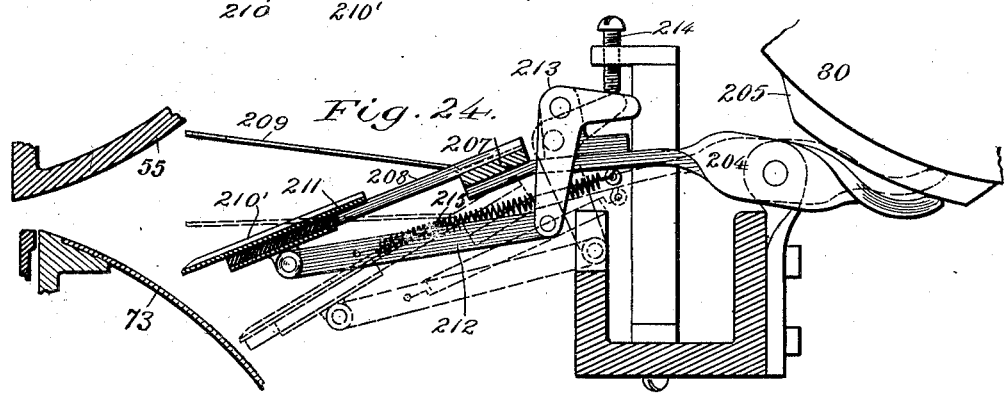
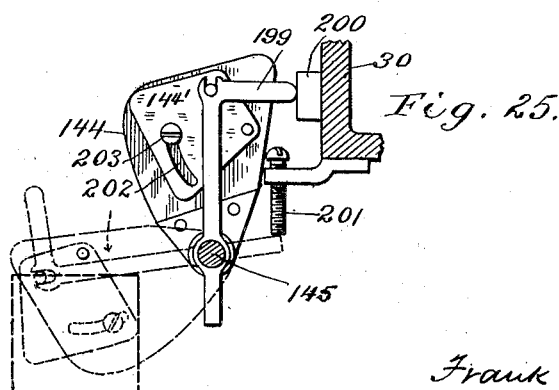

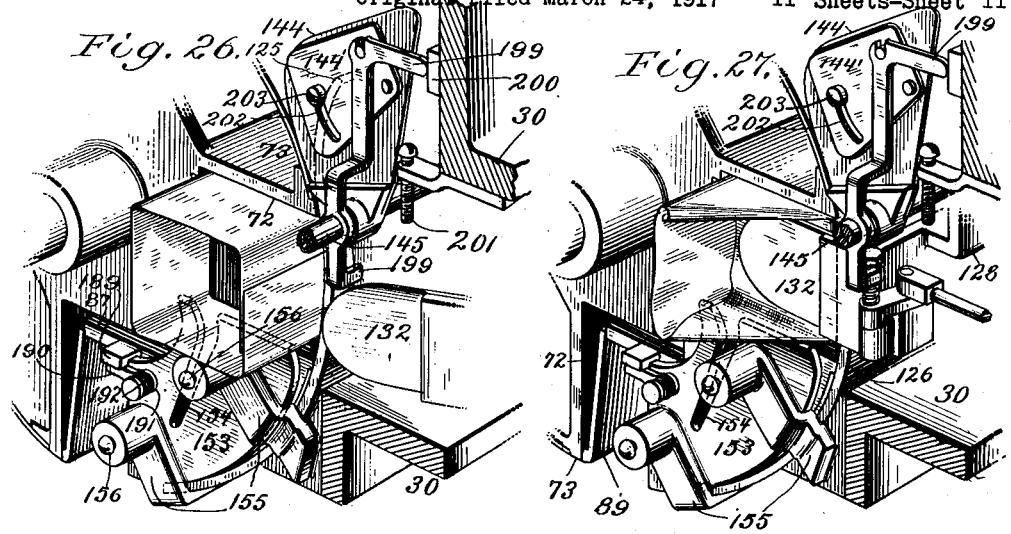
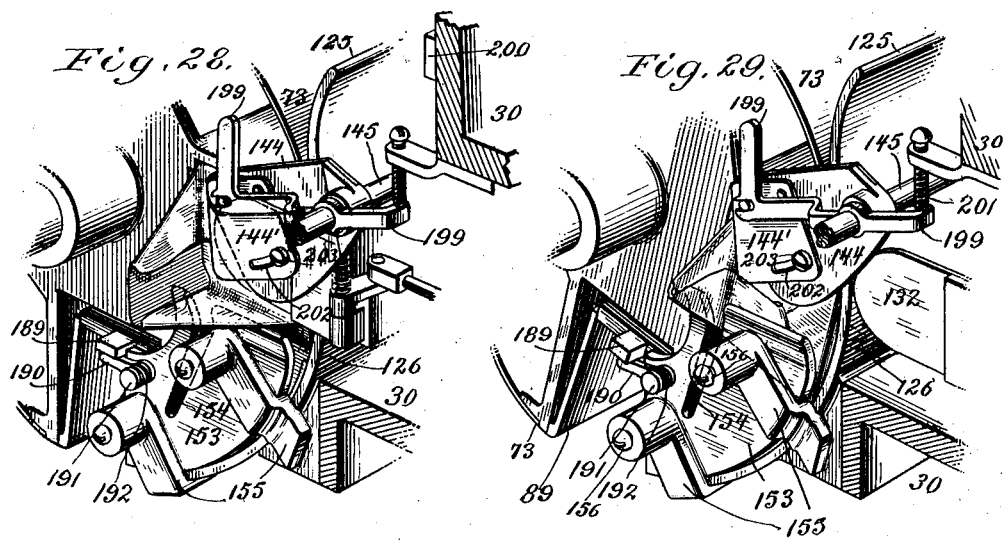
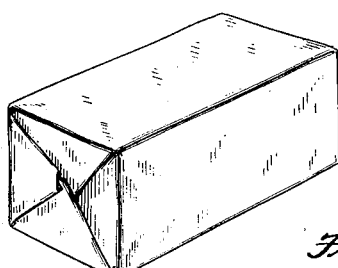

Patented July 14, 1925.　　　　　　　　　　　　　　　　1,545,513

UNITED STATES PATENT OFFICE.

FRANK M. PETERS, OF NEW YORK, N. Y., AND WARREN H. HUNGERFORD, OF CHICAGO, ILLINOIS; SAID HUNGERFORD ASSIGNOR TO SAID PETERS.

MACHINE FOR MOLDING AND WRAPPING PLASTIC AND ANALOGOUS MATERIAL.

Application filed March 24, 1917, Serial No. 157,177. Renewed October 25, 1923.

*To all whom it may concern:*

Be it known that we, FRANK M. PETERS, a citizen of the United States, residing at the city of New York, borough of Manhattan, in the county and State of New York, and WARREN H. HUNGERFORD, a citizen of the United States, residing at Chicago, Cook County, in the State of Illinois, have invented certain new and useful Improvements in Machines for Molding and Wrapping Plastic and Analogous Material, of which the following is a full, clear, and exact specification.

This invention relates to improvements in machines for molding and wrapping plastic material such as butter or the like, and the same has for its object to provide a machine adapted to receive said plastic material in bulk, to form the material into units of predetermined size, weight and shape, to enclose the units within a suitable enveloping medium, and finally to discharge the enveloped units or elements.

Further, said invention has for its object to provide a receptacle from which the material is forced into a suitable mold by vanes carried by a rotating member.

Further, said invention has for its object to provide a machine having a receptacle from which the material is forced into a mold by means of movable vanes carried by a rotating member and periodically moved into operative position.

Further, said invention has for its objeect to provide a machine having a receptacle provided with a discharge outlet from which the material is forced into a mold adapted to be moved into and out of register with said outlet.

Further, said invention has for its object to provide a machine having a receptacle provided with a discharge outlet from which the material is forced into molds adapted to be successively moved into and out of register with said outlet.

Further, said invention has for its object to provide a machine embodying a pair of movable members, one of which is provided with a plurality of pockets to receive the material, and the other of which is provided with a plurality of wrapping receptacles, which members are synchronously operated whereby to cause the pockets and receptacles successively to register with one another to permit of the material being transferred from the pockets into the receptacles.

Further, said invention has for its object to provide a machine embodying a wrapping receptacle to receive the material partially enclosed within an enveloping member which is wrapped or folded about said material while within said receptacle after which the enveloped material is ejected from the receptacle.

Further, said invention has for its object to provide a machine in which the member for molding the material, and the member for subsequently receiving said molded material are so actuated with respect to each other that the material will be fully released and discharged from said molding member before it is conveyed by said receiving member for the succeeding operation to be performed thereon.

Other objects will in part be obvious and in part be pointed out hereinafter.

To the attainment of the aforesaid objects and ends our invention consists in the novel details of construction, and in the combination, connection and arrangement of parts hereinafter more fully described and then pointed out in the claims.

In the accompanying drawings showing an illustrative embodiment of the invention—

Figure 1 is essentially a side elevation of a machine constructed according to and embodying our said invention;

Fig. 2 is a similar view looking at the machine from the opposite side, certain of the parts being broken away and in section;

Fig. 3 is a plan or top view of the machine;

Fig. 4 is an enlarged detail transverse vertical section through the die-wheel and wrapping-wheel and associated parts taken essentially on the line 4—4 of Fig. 5;

Fig. 5 is an enlarged detail longitudinal vertical section of the parts shown in Fig. 4, the same being taken essentially on the line 5—5 of Fig. 4;

Fig. 6 is a plan or top view of part of the mechanism for actuating the wrapping wheel;

Fig. 7 is a face of the same;

Fig. 8 is an enlarged detail vertical transverse section of the hopper and related parts taken essentially on the line 8—8 of Fig. 9;

Fig. 9 is an enlarged detail vertical longitudinal section of the hopper and related parts taken essentially on the line 9—9 of Fig. 8;

Fig. 10 is an enlarged detail edge view of the wrapping wheel and its related parts;

Fig. 11 is an enlarged plan or top view showing a portion of the feeding and cutting mechanisms;

Fig. 12 is an enlarged detail perspective view of the die-wheel showing the arrangement of the plungers therein;

Fig. 13 is a detail side elevation showing the die-wheel and the mounting therefor;

Fig. 14 is a detail perspective view of the cam shaft extending into and serving partly to support the die-wheel, together with the indicating device on said cam shaft;

Fig. 15 is a detail end view of the cam shaft shown in Fig. 14 with the cam shown in section and engaged with the pin of one of the plungers of the die-wheel;

Fig. 16 is a detail perspective view of the rocking wall of the hopper;

Figs. 17 and 18, respectively, are side and end views of the folding blade and support therefor which serve to give the initial fold to the wrapper enclosing a unit of folding material;

Fig. 19 is a detail side view of the mechanism which serves to fold over the top end portions of the wrapper;

Fig. 20 is an inverted plan or bottom view of the mechanism shown in Fig. 19;

Fig. 21 is a rear end view of the mechanism shown in Fig. 19 looking from the right thereof;

Fig. 22 is a detail perspective view of one of the folding blades shown in Fig. 19, the parts thereof being shown in separated relation to one another;

Fig. 23 is a plan or top view of the paper guiding and supporting means;

Fig. 24 is a side view thereof;

Fig. 25 is a side view of one of the folder wings and part of the actuating mechanism therefor;

Figs. 26 to 29, inclusive, are detail perspective views of the folding mechanisms graphically illustrating the successive steps performed in the folding of the end portions of the wrapper, and Fig. 30 is a perspective view showing the completed product of the machine.

Referring to the drawings, 30 indicates the frame of the machine upon which the various parts are supported. The hopper 31, for receiving the butter or other material to be molded and packed, comprises a pair of side plates 32 and 33 and a discharge-conduit 34, the side plate 33 being removable and normally held in position by suitable fastening means 35. The hopper further comprises a rocking wall 35' the purpose and operation of which will be described hereinafter.

Journalled within bearings on the frame 30 and on the side plate 32 is a shaft 36 having secured to one of its ends a gear wheel 37. Positioned within the hopper 31 and secured to the shaft 36 is a rotatable member 38 provided with longitudinally-extending recesses or depressions 39 in its outer surface, in which are disposed vanes 40 secured to rods 41 rotatably mounted upon the member 38. Arms 42 attached to the rods 41 carry rollers 43 which, as the member 38 rotates, are carried into and out of engagement with a cam 44 fixed to the frame 30. The cam 44 is provided with an inwardly movable portion 45 which is yieldingly held in its normally outward position under the desired tension by means of a spring pressed rod 46, having a hand wheel 46' threaded upon its outer end by means of which the tension of the spring may be varied whereby the density of the plastic mass may be varied.

During the rotation of the member 38, as the rollers 43 successively engage the cam 44, the arms 42 will be moved successively outwardly and this movement of the arms will rotate the rods 41 so as to cause the vanes 40 to be moved outwardly into their operative positions in which positions they are held by the co-action of the rollers 43 with the cam 44 until they arrive at the discharge conduit 34 of the hopper 31. While the vanes 40 are held in their operative positions they will engage and advance a charge of butter within the hopper 31 and force it from the hopper into and through the discharge-conduit 34. As each vane 40 approaches the upper end of the rocking wall 35' the latter is moved inwardly and is held in its inner position until the vane has travelled a distance corresponding to the height thereof, after which the rocking wall 35' is moved outwardly. The inward movement of the rocking wall 35' serves to compress or compact the butter as it is being acted upon by the vanes 40, and while the rocking wall is held in its inner position, until the vanes reach the lower edge thereof, the butter is prevented from being forced back into the hopper 31. This movement of the rocking wall 35' is effected by means of a rod 47, having one of its ends adjustably connected to a link 48 secured to the rocking wall 35'. The rod 47 is provided with a roller 49 adjacent its other end which engages a cam slot 50 in the cam disk 51, secured to a shaft 52 carrying a gear wheel 53 meshing with a gear wheel 54 which in turn meshes with the gear wheel 37 on the shaft 36. Secured to the shaft 52 is a sprocket wheel 167 driven by a chain 168 which engages a sprocket wheel 169 upon the shaft 81. The shaft 81 carries a gear wheel 170 which meshes with a gear wheel 171 secured to the main driving shaft 99 upon which a driving pulley 100 is loosely mounted and belted to any suitable driving mechanism. The pulley 100 is operatively connected to the shaft 99 by a suitable clutch 172, which is actuated by a hand lever 173 pivotally mounted upon a bar 174 secured to the frame 30.

Should the pressure upon any one of the vanes 40, become too great, as the butter is forced through the discharge conduit 34, the movable cam portion 45 will move inwardly against the tension of the spring-pressed rod 46 and permit the vane to move inwardly with respect to the member 38, as indicated in dotted lines in Fig. 9 whereby the excess pressure upon the vane will be relieved.

As the vanes 40 successively reach the inner end of the discharge conduit 34, the rollers 43 on the arms 42 will move out of engagement with the movable cam portion 45 and as the member 38 continues to rotate the vanes will engage the wall of the hopper 31 and be folded inwardly into the longitudinal recesses or depressions 39 in the surface of the member 38 until the rollers 43 again engage the cam 44 whereupon said vanes 40 will be moved outwardly, as above described.

Upon the frame 30 is rotatably mounted a die-wheel 55, provided with four pockets 56 adapted to be brought successively into register with the outlet-opening of the discharge conduit 34. The die-wheel 55 is provided with bearings 57, one of which is operatively connected to a gear wheel 86 secured to the inner end of a shaft 58, and the other of which is rotatably mounted upon a shaft 59. Secured to the outer end of the shaft 58 is one member 60 of a Geneva gear mechanism, the other member 61 of which is secured to a shaft 62 carrying a gear wheel 63 meshing with a gear wheel 82 on the shaft 81. The Geneva mechanism 60, 61 serves to impart an intermittent rotation to the shaft 58 and die-wheel 55, and is so proportioned and arranged that the pockets 56 of the die-wheel 55 will be brought successively into register with the outlet-opening of the discharge-conduit 34 and severally maintained in register therewith until each of said pockets can receive its charge of butter.

Secured to the sides of the discharge-conduit 34 are castings 64 forming side walls for the pockets 56 during the period they are receiving their charges of butter. Castings 65 and 66 are secured to the top and bottom of the discharge-conduit 34 and extend over a portion of the periphery of the die-wheel 55. The casting 66 serves to retain the butter within the filled pocket until it is discharged therefrom into the wrapping wheel as hereinafter described.

Reciprocatingly mounted within each of the pockets 56 of the die-wheel 55 is a piston 67, each of which is connected to the piston in the oppositely-disposed pocket by rods 68 of such length that when either one of the pistons of either pair is in its outermost position the other piston of such pair will be in its innermost position and vice versa. Each of the pistons 67 has its face portion formed of material to which the plastic material or butter will not adhere or the same may be provided with a covering of parchment or the like 67ª. By means of mechanism, hereinafter described, each piston 67 is moved to its outermost position within its pocket 56 before such pocket is brought into register with the outlet-opening of the discharge-conduit 34, and as the butter is forced from the hopper 31 through the discharge-conduit 34 it will force the piston 67 inwardly to the limit of its inward movement thereby filling the pocket 56 with a charge of butter, and forcing the oppositely-connected piston outwardly. Each piston 67 is provided with a recess 67ᵇ in one of its side edges within which is a spring-pressed ball 67ᶜ. As each of the pistons 67 reaches its innermost position the recess 67ᵇ therein will register with a hemispherical recess 67ᵈ formed in the wall of the pocket 56 whereupon the ball 67ᶜ will be forced partially out of its recess 67ᵇ and into the recess 67ᵈ to releasably hold the piston 67 in its innermost position, (Fig. 12).

The inward movement of each piston 67 is controlled by a pin 69 extending rearwardly therefrom and adapted to engage a cam 70 formed on the inner end of the shaft 59 which is rotatably mounted within a bearing removably supported upon the frame 30, (Figs. 4, 5 and 12). The cam 70 has its periphery eccentrically disposed relative to the circumferential surface of said shaft 59. By rotating the shaft 59 the position of the cam-surface 70 may be varied with respect to the inner end of the pins 69, and inward movement of the pistons 67 accordingly increased or diminished thereby controlling the amount or charge of butter received within the pockets 56. Secured to the outer end of the shaft 59 is a suitably calibrated indicating device 71 to indicate to the operator the position of the cam-surface 70, by which the charge of butter is controlled.

In order to prevent the butter adhering to the pistons 67 when being discharged from the pockets 56 a water supply tank 175 is positioned above the die-wheel 55 and provided with a discharge pipe 176 leading to a trough 177 extending substantially throughout the width of the die-wheel 55 and having a suitable opening or openings in its bottom through which the water is supplied to the periphery of the die-wheel 55 and to the butter in the pockets 56 thereof, (Figs. 2 and 5). The flow of water through the discharge pipe 176 is controlled by a valve 178 connected to one end of a rod 179, whose other end is secured to an arm 180 carried by a shaft 181 mounted upon the frame 30. An arm 182 secured to the shaft 181 is connected by a link 183 to the clutch operating lever 173. The parts are so arranged that when the lever 173 is moved to render the clutch inoperative, the valve 178 will be closed to cut off the supply of water from the tank 175, and when said lever 173 is moved to render the clutch operative, the valve 178 will be opened. It will thus be seen that water is allowed to flow from the supply tank 175 into the trough 177 only while the machine is operating.

After one of the pockets 56 has received a charge of butter the die-wheel 55 is rotated a quarter turn by the Geneva mechanism 60, 61 to bring the next pocket 56 into register with the discharge-conduit 34, and the pocket 56, which has received its charge of butter, is at the same time brought into register with one of the receptacles 72 of a wrapping wheel 73, hereinafter described. The charge of butter within the filled pocket 56 of the die-wheel 55 is thereupon forced therefrom and into one of the pockets 72 of the wrapping wheel 73 by means of a reciprocatable plunger 74 slidingly mounted in guideways 75 carried by the frame 30. The mechanism for reciprocating the plunger 74 comprises a lever 76 pivotally mounted intermediate its ends, and having one of its ends connected to a link 77 attached to the plunger 74 and its other end connected to a rock-shaft 78 mounted upon the frame 30 and carrying a roller 79 engaging a cam 80 secured to the shaft 81. As the plunger 74 moves inwardly it engages the outwardly-positioned piston 67, which is paired with the inwardly-positioned piston 67 within the filled pocket 56, and forces the same inwardly, thus causing the latter piston 67 to move outwardly whereby the butter will be forced out of the pocket 56 of the die-wheel 55 and into the pocket 72 of the wrapping wheel 73.

The plunger 74 is provided upon its sides with a pair of pivotally mounted pawls 83 which, when the plunger 74 engages the piston 67, will engage the piston 67, the pawls 83 being held in their operative positions by means of springs 83[1]. As the plunger 74 is moved upwardly the piston 67 will be drawn upwardly to occupy its outermost position, which is the position it occupies when the pocket 56, within which it is located, is brought into register with the discharge-conduit 34 by the partial rotation of the die-wheel 55 immediately following the completion of the upward movement of the plunger 74. As the piston 67 reaches its outermost position, the projections 83[2], carried by the upper ends of the pawls 83, will engage plates 75[1] secured to lugs 75[2] fixed to the guideways 75, whereupon the pawls 83 will be swung outwardly to cause their free ends to move out of engagement with the piston 67.

The wrapping wheel 73 is provided with a plurality of receptacles 72 and is secured to a shaft 84 to which is also secured a collar 184 having a laterally-extending lug 185. Loosely mounted upon the shaft 84 is a gear wheel 85 meshing with the gear wheel 86 secured to the die-wheel shaft 58. A lug 186 upon the gear wheel 85 carries an adjustable screw 187 normally held in engagement with the lug 185 of the collar 184 by springs 188 secured to the gear wheel 85 and to the collar 184. The wrapping wheel 73 will consequently be rotated in synchronism with the die-wheel 55, as a result of which, the receptacles 72 and the pockets 56 will be successively brought into register with one another, thus permitting the butter to be forced from the pockets of the die-wheel 55 into the receptacles of the wrapping wheel 73, as hereinbefore described.

While this arrangement of the parts causes the intermittent rotation of the gear wheel 86 to produce an intermittent rotation of the gear wheel 85, together with the shaft 84 and the wrapping wheel 73, said shaft 84 and the wrapping wheel 73 are capable of being rotated independently of the gear wheel 85 for the purpose and in the manner hereinafter described.

Reciprocatingly mounted within each pocket 72 of the wrapping wheel 73 is a piston 87 each of which is connected to the piston in the oppositely-disposed receptacle by a rod 88 whereby inward movement of one of the pistons of each pair will cause outward movement of the other piston of such pair. Each piston 87 is in its outermost position when the receptacle 72, in which it is positioned, is in register with one of the pockets 56 of the die-wheel 55, and as the butter is forced from the pocket 56 into the receptacle 72 the piston 87 will be moved inwardly thereby causing the other piston of the pair to be moved outwardly with respect to its receptacle. The pistons 87 are provided with laterally extending lugs 189, and when each piston is in position to receive therein the butter from one of the pockets 56 the under surface of the lug 189 of the other piston 87 of the pair of pistons is engaged by a finger 190 pivotally supported upon a pin 191 and pressed upwardly against the lug 189 by a coiled spring 192, (Figs. 2, 26 to 29 inclusive). The tension of the spring 192 offers sufficient resistance to the downward movement of the pair of pistons 87, as the charge of butter is forced from the die-wheel pocket 56 into the wrapping wheel receptacle 73, to insure that the sheet of paper engaged by the butter and forced into the receptacle, as hereinafter described, will be prevented from shifting relatively to the butter. Each receptacle 72 is also provided with a movable inner plate 89 pivotally supported adjacent its outer edge upon one of the walls of the receptacle 72. A spring 90 seated within a recess 91 in said wall of the receptacle 72 engages the movable plate 89 adjacent its inner edge and normally forces the same inwardly with respect to the receptacle 72.

As the die-wheel 55 and the wrapping wheel 73 rotate a strip of paper 92 is fed between them from a roll of paper supported upon the frame 30. The strip of paper 92 passes from the roll between a pair of rollers 93, 94. The roller 93 is secured to a continuously rotating shaft 95 carrying a sprocket wheel 96 driven by a chain 97 which engages a sprocket wheel 98 secured to the main driving shaft 99. The strip of paper then passes between a pair of rollers 101, 102. The roller 102 is secured to a shaft 103 carrying a gear wheel 104 which is driven by gear wheels 105, 105ª meshing with a gear wheel 106 secured to the shaft 84 carrying the wrapping wheel 73. As the wrapping wheel 73 is rotated intermittently the roller 101 will likewise be driven intermittently and in unison with the wrapping wheel.

As the rollers 93 and 94 are continuously driven, in order to prevent slipping of the paper during the feeding thereof, the paper strip will sag and form a loop which is taken up by the faster running rollers 101, 102 which are driven intermittently, thereby preventing any strain on the paper strip between the two pairs of rollers.

After passing between the rollers 101 and 102 the paper strip passes between the cutting blades 107 and 108, and thence between the die-wheel 55 and wrapping wheel 73, (Figs. 2, 4 and 5). The cutting blade 107 is stationary while the cutting blade 108 is movable. The movable cutting blade 108 is pivotally supported at one of its ends and has its other end connected by a link 109 to one arm of a bell crank lever 110 whose other arm is connected to a pivotally mounted lever 111 carrying a roller 112 engaging a cam 113. The cam 113 is secured to the shaft 95 of the roller 93 and is so shaped that the movable cutting blade 108 will be actuated to cut the paper during the time that the rollers 101 and 102 are at rest. The cutting blade 108 is held firmly in engagement with the cutting blade 107 and prevented from vibrating with respect thereto by a block 114 which is adjustably mounted upon a casting 115 in order that the wear on the cutting blades may be compensated for.

As the paper strip passes between the die-wheel 55 and the wrapping wheel 73 its free end engages an oscillating paper support secured to one end of a lever 204 pivotally mounted upon a transverse member of the machine frame. The other end of the lever 204 engages a cam projection 205 on the cam 80 secured to the shaft 81. The paper support comprises a transverse member 207 to which are secured four downwardly inclined members 208 and a pair of upwardly inclined members 209. Each of the two outer members 208 has secured thereto a plate 210, and the two inner members 208 carry a plate 211 having guideways formed in its sides which receive the inner members 208, thereby permitting of a sliding movement of the plate 211 upon its supporting members 208. The plates 210 and 211 are provided on their upper surfaces with longitudinally extending ribs 210' to prevent the paper adhering to the plates. The sliding movement of the plate 211 is effected by means of a link 212 having one of its ends connected to the underside of the plate 211 and its other end connected to one arm of a bell crank lever 213 pivotally supported upon the lever 204. The other end of the bell crank lever 213 engages an adjustable stop 214 supported upon the frame of the machine and is maintained in engagement with said stop by means of a spring 215 the ends of which are secured to the link 212 and to the lever 204. In operation, as the cam 80 rotates the lever 204 will be rocked about its pivoted point of support by the cam projection 205 thereby causing the paper support to be raised and lowered.

As the paper support rises the bell crank lever 213 will be rocked about its pivot to cause the plate 211 to move outwardly upon its supporting members 208 whereby the front edge of the plate 211 will be advanced to receive thereon the free end of the paper strip as it is delivered by the die-wheel 55 and wrapping wheel 73. As the paper support is again lowered the plate 211 will be retracted or moved inwardly, owing to the action of the spring 215 in order to clear the periphery of the wrapping wheel 73. The rising and falling movement of the paper support together with the sliding movement of the plate 211 serves to prevent the paper from being wrinkled or distorted and insures the sheet which is severed from the strip by cutting blades 107 and 108 being presented smooth and undistorted to the block of butter about which the same is to be wrapped.

It will thus be seen that when the die-wheel 55 is brought to rest with a pocket 56 containing a charge of butter registering with a receptacle 72 of the wrapping wheel 73, which will also be at rest, there will be a sheet of paper interposed between the registering members which sheet will have been cut from the strip 92 by the action of the cutting blades 107, 108. As the block-shaped charge of butter is forced from the pocket 56 into the receptacle 72, as above described, the sheet of paper will be carried into the receptacle 72 by said block-shaped charge, and in contact with and covering three sides thereof.

Immediately after the charge of butter has been forced from the pocket 56 into the receptacle 72, and before the succeeding partial rotation of the wrapping wheel 73 by the Geneva mechanism 60, 61, the wrapping wheel 73 is subjected to a slight rotary movement in order to effectually separate the charge of butter from and prevent the same adhering to the piston 67 of the die-wheel. The mechanism for effecting this slight rotary movement comprises a cam 193 secured to the shaft 81 and having a projection 194 adapted to engage one arm of a bell-crank lever 195 pivotally supported upon the frame 30, (Figs. 1 and 3). The other arm of the bell-crank lever 195 is connected to a pawl 196 co-acting with the teeth of a ratchet wheel 197 secured to the shaft 84 upon which the wrapping wheel 73 is mounted. When the wrapping wheel 73 is in its position of rest the pawl 196 will be in engagement with one of the teeth of the ratchet wheel 197. The teeth of the ratchet wheel 197 correspond in number and position with the number and positions of the receptacles 72 of the wrapping wheel 73. The cam 193 is so adjusted upon the shaft 81 that it will actuate the bell-crank lever 195 and cause the pawl 196 to slightly rotate the ratchet wheel 197 immediately after the butter has been forced into the receptacle 72. This slight rotation of the ratchet wheel 197 will cause a corresponding rotation of the shaft 84 and of the wrapping wheel 73 secured thereto. The gear wheel 85 remains stationary during this movement of the shaft 84 owing to the fact that as the shaft 84 thus rotates the collar 184, which is secured thereto, moves in a direction to carry the lug 185 out of engagement with the screw 187. When the cam 193 moves out of engagement with the bell-crank 195 the springs 188 restore the shaft 84 and the parts secured thereto to their former positions with the lug 185 of the collar 184 engaging the screw 187 whereby the shaft 84 will be rotated by the succeeding partial rotation of the gear wheel 86. The pawl 196 and bell-crank lever 195 are also restored to their normal positions by means of the springs 188.

Before the wrapping wheel 73 is rotated to bring the next receptacle 72 into position to receive its charge of butter, one of the upwardly-extending portions of the sheet of paper is folded over the top of the block of butter by an oscillating folding blade 116, recessed adjacent to its right hand end (Fig. 4) to accommodate the intermeshing gears 85, 86, and supported upon the free ends of rocking arms 117, 117. Stops 118 carried by the blade 116 are normally held against stops 119 carried by the rocking arms 117 by springs 120. This construction permits movement of the blade 116 relatively to the rocking arms 117, 117 in order to compensate for imperfections or irregularities in the material to be wrapped, and also serves to hold the blade 116 out of engagement with the wrapping wheel 73 when in its inoperative position. The oscillating movement of the blade 116 is effected by means of mechanism comprising a link 121 secured to one of the rocking arms 117, and to one arm of a bell-crank lever 122 the other arm of which carries a roller 123 engaging a cam 124 secured to the shaft 62, (Fig. 2).

After the first fold has been completed the wrapping wheel 73 is rotated together with the die-wheel 55 to bring the next receptacle 72 of the former into register with the next pocket 56 of the latter. During this partial rotation of the wrapping wheel 73 the remaining upwardly extending portion of the sheet of paper is carried into engagement with an abutment 125 at the upper end of a curved plate 126 carried by the frame 30. As the paper engages the abutment 125 it will be folded thereby over the top of the block of butter within the receptacle 72 and the butter will then be enclosed in a rectangular sleeve-like envelope of paper as shown in Fig. 26. A spring-pressed plate 127 registering with an opening in the curved plate 126 holds the thus folded portions of the paper firmly against the top of the block of butter when the wrapping wheel comes to rest and during the next two steps in the folding operations.

The next step in the folding operation consists in folding the top end portions of the paper envelope inwardly over the ends of the block of butter. The mechanism for forming this fold comprises a longitudinally movable carriage 128 slidingly mounted upon a guide 129. At its forward end the carriage 128 is provided upon each side thereof with a bracket 130 within which is mounted a block 131 having a folder plate 132 pivotally supported thereon. Each block 131 is provided with a threaded stem 133 passing through openings in lugs 134 and carrying nuts 135 by means of which the block 131 may be adjusted transversely with respect to the carriage 128. The folder plates 132 are provided with arms 136 pivotally secured to rods 137 slidingly supported in fixed brackets 138. Each rod 137 has secured thereto adjustable collars 139, 140 positioned upon opposite sides of the supporting bracket 138 and which, together with the springs 141, form cushioned stops coacting with the bracket 138 to cause the associated folder plate 132 to rotate outwardly or inwardly about its pivotal point of support.

The carriage 128 is moved forwardly and rearwardly by means of a swinging arm 142 secured to the carriage 128 by a link 142ª and actuated by a cam 143 fixed upon the shaft 81.

Assuming the carriage 128 to be in its rearward or inoperative position, as shown in full lines in Figs. 19 and 20, the stops, comprising the collars 139 and the associated springs 141, will have engaged the brackets 138 as a result of which the rods 137 will have been moved forwardly relatively to the carriage and cause the folder plates 132 to assume their outermost positions. As the carriage 128 is moved forwardly the folder plates 132 will engage the top end portions of the paper envelope and fold the same inwardly towards the ends of the block of butter. As the carriage 128 approaches the limit of its forward movement the stops, comprising the collars 140 and the associated springs 141, will engage the brackets 138 and retard the movement of the rods 137 whereupon, as the carriage 128 completes its forward movement, the folder plates 132 will be rotated inwardly thereby folding the paper against the ends of the block of butter as shown in Fig. 27.

The next step in the folding operation consists in folding the end portions of one of the sides of the paper envelope over the end of the block of butter. This is accomplished by a pair of folder wings each of which comprises a plate 144 secured at one of its ends to a rotatable shaft 145 and carrying adjacent its other end a pivotally mounted plate 144', normally positioned within the geometrical outlines of the plate 144, but adapted to be projected to form an extension of the plate 144 when such plate is in its folding position. Levers 199 rotatably supported upon the shaft 145 are connected to the plates 144' and the ends of the levers 199 are adapted to engage stops 200 and 201 carried by the frame of the machine as the folder wings approach their inoperative and operative positions, respectively, whereby the plates 144' will be retracted or projected.

The rotatable shaft 145 carries a pinion 146 meshing with a reciprocatable rack 147, which is actuated by a swinging arm 148 operatively connected to the rear end of the rack and carrying a roller 149 engaging a cam groove 150 in the face of the cam 80 secured to the shaft 81. When the folder wings 144, 144' are in their normal or inoperative position the ends of the levers 199 are in engagement with the stops 200, and the plates 144' are held in their retracted positions. As the shaft 145 rotates the folder wings will engage the end portions of one of the sides of the paper envelope and fold the same over the end of the block of butter as shown in Fig. 28.

As the folder wings approach the limit of their movement the ends of the levers 199 will engage the stops 201 thereby causing the plates 144' to rotate about their pivots into their extended positions. Movement of the plates 144' is limited by means of slots 202 formed therein which engage pins 203 carried by the plates 144. The shaft 145 carries a member 151 adapted to engage adjustable stops 152 by means of which the rotary movement of the shaft 145 may be varied. The cam 143 controlling the movement of the carriage 128, and the cam groove 150 controlling the movement of the shaft 145 are so shaped that the folder wings 144, 144' will not be actuated until the folder plates 132 have completed their folding operation, and after being actuated the folder wings 144 will be held in their folding positions until the folder plates 132 are withdrawn, (see Fig. 29) and until the wrapping wheel 73 begins its next partial rotation.

The folding operation is completed during the next partial rotation of the wrapping wheel 73 in the following manner:—

At each side of the wrapping wheel 73 there is fixed a plate 153 having an outwardly curved upper end and provided with a downwardly extending slot 154 inclined outwardly with respect to the axis of rotation of the wrapping wheel 73. The plates 153 are adjustably held in their operative positions by brackets 155 carrying screws 156 which pass through recesses 157 formed in the brackets 155 and engage threaded holes formed in lugs 158 on the plates 153. Springs 159 positioned within the recesses 157, surrounding the screws 156, engage the lugs 158 and the end walls of the recesses 157 and permit the plates 153 to yield slightly to compensate for any irregularities in the size or shape of the block of butter which is being wrapped.

During the partial rotation of the wrapping wheel 73 after the top end portions and the end portions of one side of the paper envelope have been folded, as above set forth, the end portions of the other side of the envelope will engage the outwardly curved upper ends of the plates 153 and will be folded thereby over the ends of the block of butter. At the same time the bottom end portions of the envelope will enter the slots 154 in said plates 153, and as the slots 154 are inclined outwardly with respect to the axis of rotation of the wrapping wheel 73, they will cause the bottom end portions of the paper tube to be folded over the ends of the block of butter and thus complete the folding operation.

When the above-mentioned partial rotation of the wrapping wheel 73 ceases, the receptacle 72 thereof containing the wrapped block of butter will be in its lowermost position, and as the piston 87 within said receptacle 72 will be in its innermost position the piston which is connected thereto will be in its outermost position. The receptacle 72 within which the last-named piston is positioned will be in register with a filled pocket 56 of the die-wheel 55 in readiness to receive the block of butter therefrom as above described. As the plunger 74 is operated in the manner, hereinabove described, the charge of butter will be forced from the filled pocket 56 of the die-wheel 55 into the registering receptacle 72 of the wrapping wheel 73, and thereby cause the piston 87 within said receptacle 72 to be moved inwardly. The inward movement of this piston will cause an outward movement of its associated piston which is within the receptacle containing the wrapped charge or block of butter whereby said wrapped charge or block will be discharged from the wrapping wheel 73. When said charge or block is forced out of the receptacle 72 of the wrapping wheel 73 it is preferably received upon a suitable conveyor 160 by means of which it is conveyed to any desired place to be boxed or otherwise treated. The conveyor 160 is driven by means of a chain 161 engaging a sprocket wheel 162 secured to the main driving shaft 99 and a sprocket wheel 163 on a shaft 164. Upon the shaft 164 is secured a pinion 163$^a$ meshing with an intermediate pinion 164$^a$ fixed upon a shaft 164$^b$ and meshing with a gear wheel 164$^x$ fixed to a shaft 165 carrying the driving drum 166 for the conveyor.

In the machine illustrating the invention, the die-wheel 55 and wrapping wheel 73 are shown as having four pockets and four receptacles, respectively, whereby each partial rotation of the two wheels will amount to a quarter revolution thereof, but it will, of course, be understood that the number of pockets, and the extent of each partial rotation of the wheels may be varied without departing from the spirit of the invention.

The operation of the machine, which should be largely obvious from the above description, is as follows:

The clutch operating lever 173 is moved to render the clutch 172 operative, and at the same time to open the valve 178 to permit water to flow from the tank 175 into the trough 177. The butter, which is to be formed into blocks and wrapped in paper, is fed into the hopper 31 and is forced therefrom by the vanes 40 of the constantly rotating member 38 through the discharge conduit 34 and into the pockets 56 of the die wheel 55, as said pockets are successively brought into register with the outlet-opening of the discharge conduit. The Geneva mechanism 60, 61 is so proportioned that as each of the pockets 56 registers with the outlet-opening of the discharge-conduit 34, the die-wheel 55 will be maintained in a position of rest until such a pocket has completely received its charge of butter. The die-wheel 55 is thereupon given a quarter revolution, thus bringing the next succeeding pocket 56 into register with the discharge conduit 34 and bringing the filled pocket 56 into register with one of the receptacles 72 of the wrapping wheel 73 which is rotated in synchronism with the die-wheel 55, as above described, and after the two wheels have completed their quarter revolution they are maintained at rest while the next succeeding pocket 56 receives its charge of butter, and so on.

During each period of rest the plunger 74 is reciprocated, as above described, its downward movement forces the butter from the filled pocket 56 of the die-wheel into the registering receptacle 72 of the wrapping wheel 73, and its upward movement draws the piston 67 of the oppositely-disposed pocket 56 into its outermost position in readiness to be presented to the outlet opening of the discharge conduit 34. As the molded charge of butter is forced from the pocket 56 of the die-wheel 55 into the registering receptacle 72 of the wrapping wheel 73 the sheet of paper, which has been severed from the strip 92 by the cutting blades 107, 108, will be carried thereby into the receptacle 72. Immediately after the molded charge of butter has been forced into the receptacle 72 the cam 193 will engage the bell-crank lever 195 and actuate the same to cause the pawl 196 and ratchet wheel 197 to impart a slight rotary movement to the wrapping wheel 73 to sever the butter from and prevent the same adhering to the piston 67 of the wheel 55, the wrapping wheel being restored to its position by means of the springs 188. While the two wheels 55 and 73 still remain at rest the first fold of the paper will be made by the oscillating folding blade 116, as heretofore described.

The two wheels 55 and 73 are then given a quarter revolution whereby the next succeeding pocket 56 of the die-wheel 55 is brought into register with the discharge conduit 34 and the receptacle 72 of the wrapping wheel 73 containing the molded charge or block of butter will be brought into operative relation to the folder plates 132 and the folding wings 144, 144'.

During this quarter revolution of the wrapping wheel 73 the second fold of the paper is effected by means of the abutment 125 at the upper end of the curved plate 126. The two wheels are then brought to rest while the butter is forced from the next pocket 56 of the die-wheel 55 into the next receptacle 72 of the wrapping wheel 73. During this period of rest the folder plates 132 and the folding wings 144, 144' are operated to fold the top end portions and the end portions of one of the sides of the paper envelope over the ends of the block of butter in the manner above described.

The die-wheel 55 and the wrapping wheel 73 are then again rotated a quarter of a revolution, and during this movement of the wrapping wheel 73, the end portions of the other side and the bottom end portions of the paper envelope are folded over the ends of the block of butter by means of the outwardly curved ends of the plates 153 and the slots 154 which are formed in said plates.

The wheels 55 and 73 are again brought to rest when the next succeeding pocket 56 and receptacle 72 are in register with one another, and as the butter is forced from the pocket 56 into the receptacle 72 the wrapped block of butter will be discharged from its receptacle to the conveyor 160, as above described, thus completing the operation, the various steps of which are constantly being repeated while the machine is being operated.

It will be seen that during each period of rest of the die-wheel and the wrapping wheel 55 and 73, one of the pockets 56 of the die-wheel 55 will be filled with butter, while the block of butter in a previously filled pocket 56 will be forced therefrom into one of the receptacles 72 of the wrapping wheel 73, and one side of the sheet of paper will be folded over the top thereof. At the same time the top end portions and the end portions of one of the sides of the paper envelope will be folded over the ends of a block of butter in a previously filled receptacle 72 of the wrapping wheel 73, and coincidently therewith a completely wrapped block of butter will be forced from another of the receptacles 72 upon the conveyor 160.

It is to be noted that by means of our machine hereinabove described we are enabled accurately to determine the weight to a fraction of an ounce for any desired size of unit by varying the density of the plastic mass which may be readily and accurately controlled by means of the hand-wheel 46$^a$ and associated parts and by varying the size of the print which may be accurately controlled or regulated by the cam 70 and its associated parts.

It will, of course, be understood that while the operation of the machine has been described in connection with the packaging of butter, it may, nevertheless, be employed for the packing of any other plastic materials.

Having thus described our said invention, what we claim and desire to secure by Letters Patent is:—

1. In a machine of the character described, a hopper adapted to receive a plastic material means for receiving said material after the same leaves said hopper, a compacting conduit interposed between said means and said hopper, and means movable towards said conduit for compacting said material therein prior to the entry thereof into said receiving means, substantially as specified.

2. In a machine of the character described, a hopper adapted to receive a plastic material, means for receiving said material after the same leaves said hopper, and means for positively feeding said material from said hopper towards said receiving means, said feeding means being movable towards said receiving means to compact said material entering therein, substantially as specified.

3. In a machine of the character described, a hopper adapted to receive a plastic material, means for receiving said material after the same leaves said hopper, and means for positively and continuously feeding said material towards said receiving means, said feeding means being movable towards said receiving means and acting continuously to compact said material and force the same into said receiving means, substantially as specified.

4. In a machine of the character described, a hopper adapted to receive a plastic material, means mounted in said hopper for continuously feeding said material therefrom, said means cooperating with the said hopper to initially compact said material therein, and means for receiving said compacted material, substantially as specified.

5. In a machine of the character described, a hopper adapted to receive a plastic material, means for receiving said material after the same leaves said hopper, a compacting conduit interposed between said hopper and said means, means mounted in said hopper for continuously feeding said material towards said conduit, said means cooperating with said hopper to initially compact said material therein, and to continuously compact said material within said conduit and mold the same prior to the entry thereof into said receiving means, substantially as specified.

6. In a machine of the character described, a hopper adapted to receive a plastic material, means for receiving said material after the same leaves said hopper, means for continuously feeding said material towards said receiving means and for continuously compacting the same in said hopper, and means for maintaining the density of said material at a predetermined degree, substantially as specified.

7. In a machine of the character described, a hopper adapted to receive a plastic material, means for receiving said material after the same leaves said hopper, means mounted in said hopper for continuously feeding said material towards said receiving means, said feeding means and hopper cooperating to initially compact said material therein, and means rendered operable as the density of said material increases to maintain the density of said material at a predetermined degree, substantially as specified.

8. In a machine of the character described, a hopper adapted to receive a plastic material, means for receiving said material after the same leaves said hopper, means for compacting said material prior to the entry thereof into said receiving means, and adjustable means for maintaining the density of said material at a predetermined degree, substantially as specified.

9. In a machine of the character described, a hopper adapted to receive a plastic material, means including a plurality of pockets adapted to be successively positioned to receive said material after the same leaves said hopper, means for feeding said material to said pockets, and a single adjusting means common to said several pockets to control the quantity of said material entering the same, substantially as specified.

10. In a machine of the character described, a hopper adapted to receive a plastic material, means including a plurality of pockets adapted to be successively positioned to receive said material after the same leaves said hopper, a single adjusting means common to said pockets to control the quantity of material entering the same, and means for feeding said material to said pockets, and arranged to maintain a predetermined density of said material therein.

11. In a machine of the character described, a hopper adapted to receive a plastic material, means for receiving said material after the same leaves said hopper, adjusting means therefor whereby the quantity of material forced thereinto may be controlled, means in said hopper for feeding said material towards said receiving means and for compacting the same prior to the entry thereof into said receiving means, and means associated with said feeding means to maintain the density of said compacted material entering said receiving means at a predetermined degree.

12. In a machine of the character described, a hopper adapted to receive a plastic material, means including a plurality of pockets adapted to be successively positioned to receive said material after the same leaves said hopper, and means in said hopper for continuously feeding said material towards said receiving means and serving to continuously compact said material for entry thereof into said receiving means in a duly compacted condition, substantially as specified.

13. In a machine of the character described, a hopper adapted to receive a plastic material, means including a plurality of pockets adapted to be successively positioned for the reception of said material after the same leaves said hopper, means for continuously feeding said material towards said receiving means and for continuously compacting the same for entry thereof into said pockets in a duly compacted condition, and means for maintaining the volume and density of the molded mass at a predetermined degree for a given adjustment of the machine, substantially as specified.

14. A machine of the character described comprising a receptacle adapted to receive a plastic mass, means operatively associated with said receptacle for receiving and shaping said mass into units of predetermined size, and continuously-acting means for compacting said plastic mass to a predetermined degree and for ejecting the same from said receptacle into said receiving and shaping means, said continuously-acting means being adjustable whereby to regulate the weight of each unit for any given volume, substantially as specified.

15. A machine of the character described comprising a receptacle adapted to receive a plastic mass, means operatively associated with said receptacle for receiving and shaping said mass into units of predetermined size, said means being adjustable to vary the size of the received units, and continuously-acting means for compacting said plastic means to a predetermined degree and for ejecting the same from said receptacle into said receiving and shaping means, said continuously-acting means being adjustable whereby to regulate the weight of each unit for any given volume, substantially as specified.

16. In a machine of the class described, a hopper adapted to receive a plastic material and provided with a discharge outlet, a rotatable member within said hopper provided with yielding means to force the plastic material through said outlet, means for varying the yieldability of said yielding means whereby the density of the material may be varied, and means to receive the discharged material, substantially as specified.

17. In a machine of the class described, a hopper adapted to receive a plastic material and provided with a discharge outlet, a rotatable member within said hopper provided with yielding vanes to force the plastic material through said outlet, means for varying the yieldability of said yielding vanes whereby the density of the material may be varied, and means to receive the discharged material, substantially as specified.

18. In a machine of the class described, a hopper adapted to receive a plastic material and provided with a discharge outlet, a rotatable member within said hopper, vanes movably mounted upon said member and adapted to be projected outwardly with respect thereto, means for projecting said vanes outwardly from said member and for holding them in their projected positions during a portion of the rotation of said member, whereby said vanes will engage the plastic material and force the same through said discharge outlet, said means comprising a fixed portion to hold said vanes against retractive movement and a yielding portion to permit retractive movement of said vanes when the pressure upon the vanes exceeds a predetermined value, and means to receive the discharged material, substantially as specified.

19. In a machine of the class described, a hopper adapted to receive a plastic material and provided with a discharge outlet, a rotatable member within said hopper, vanes movably mounted upon said member and adapted to be projected outwardly with respect thereto, a cam for projecting said vanes outwardly from said member and for holding them in their projected positions during a portion of the rotation of said member, whereby said vanes will engage the plastic material and force the same through said discharge outlet; said cam comprising a yielding portion to permit retractive movement of said vanes when the pressure upon the vanes exceeds a predetermined value, and means to receive the discharged material, substantially as specified.

20. In a machine of the class described, a hopper adapted to receive a plastic material and provided with a discharge outlet, a rotatable member within said hopper, vanes movably mounted upon said member and adapted to be projected outwardly with respect thereto, a cam for projecting said vanes outwardly from said member and for holding them in their projected positions during a portion of the rotation of said member, whereby said vanes will engage the plastic material and force the same through said discharge outlet; said cam comprising a yielding portion to permit retractive movement of said vanes when the pressure upon the vanes exceeds a predetermined value, means for varying the yieldability of said yielding portion of said cam, and means to receive the discharged material, substantially as specified.

21. In a machine of the class described, a hopper adapted to receive a plastic material and provided with a discharge outlet, a rotatable member within said hopper, vanes pivotally mounted upon said member and adapted to be projected outwardly with respect thereto, arms operatively connected to said vanes, means adapted to be engaged by said arms as said member rotates to actuate said arms to move said vanes into their projected position and to hold them in said positions during a portion of the rotation of said member, said means comprising a yielding portion to permit retractive movement of said vanes when the pressure upon said vanes exceeds a predetermined value, and means to receive the discharged material, substantially as specified.

22. In a machine of the class described, a hopper adapted to receive a plastic material and provided with a discharge outlet, a rotatable member within said hopper, vanes pivotally supported upon said member and adapted to be projected outwardly with respect thereto, arms operatively connected to said vanes, a cam adapted to be engaged by said arms as said member rotates to actuate said arms to move said vanes into their projected positions and to hold them in said positions during a portion of the rotation of said member, said cam comprising a yielding portion to permit retractive movement of said vanes when the pressure upon the vanes exceeds a predetermined value, and means to receive the discharged material, substantially as specified.

23. In a machine of the class described, a hopper adapted to receive a plastic material and provided with a discharge outlet, a rotatable member within said hopper provided with vanes to force the plastic material through said outlet and into said pocket, said hopper comprising a rocking wall, means for moving said wall toward said rotatable member and into operative relation with said vanes, whereby the plastic material being acted upon thereby will be compressed, and means to receive the discharged material, substantially as specified.

24. In a machine of the class described, a hopper adapted to receive a plastic material and provided with a discharge outlet, a rotatable member within said hopper provided with vanes to force the plastic material through said outlet and into said pocket, said hopper comprising a rocking wall, means for moving said wall toward said rotatable member and into operative relation with said vanes and maintaining the same in its operative position during a portion of the travel of said vanes, whereby the plastic material being acted upon thereby will be compressed, and means to receive the discharge material, substantially as specified.

25. In a machine of the class described, a hopper adapted to receive a plastic material and provided with a discharge outlet, a rotatable member within said hopper provided with vanes to force the plastic material through said outlet and into said pocket, said hopper comprising a rocking wall, means for moving said wall toward said rotatable member and into operative relation with said vanes as said vanes successively approach said rocking wall, whereby the plastic material being acted upon thereby will be compressed, and means to receive the discharged material, substantially as specified.

26. In a machine of the class described, a hopper adapted to receive a plastic material and provided with a discharge outlet, a rotatable member within said hopper provided with vanes to force the plastic material through said outlet and into said pocket, said hopper comprising a rocking wall, means for moving said wall toward said rotatable member and into operative relation with said vanes as said vanes successively approach said rocking wall, whereby the plastic material being acted upon thereby will be compressed, said means serving to retain said rocking wall in its operative position until said vanes have travelled past the same, and means to receive the discharged material, substantially as specified.

27. In a machine of the class described, a hopper adapted to receive a plastic material and provided with a discharge outlet, means for forcing the material through said outlet, a pocket to receive the discharged material, means movably positioned within said pocket, and adjustable means adapted to be engaged by said movable means to limit the inward movement thereof whereby the quantity of material forced into said pocket may be controlled, substantially as specified.

28. In a machine of the class described, a hopper adapted to receive a plastic material and provided with a discharge outlet, a movable member provided with a plurality of pockets, means for moving said member to bring said pockets successively into register with said discharge outlet, means for forcing the material from said hopper into said pockets as they successively register with said discharge outlet, means movably positioned within each of said pockets, and adjustable means adapted to be successively engaged by said several movable means to limit the inward movement thereof whereby the quantity of material forced into said pockets may be controlled, substantially as specified.

29. In a machine of the class described, a hopper adapted to receive a plastic material and provided with a discharge outlet, means for forcing the material through said outlet, a pocket to receive the discharged material, depressible means within said pocket adapted to be depressed by the material as it is forced into said pocket, and adjustable means adapted to be engaged by said depressible means for limiting the movement thereof whereby the quantity of material forced into said pocket may be controlled, substantially as specified.

30. In a machine of the class described, a hopper adapted to receive a plastic material and provided with a discharge outlet, means for forcing the material through said outlet, a pocket to receive the discharged material, depressible means within said pocket adapted to be depressed by the material as it is forced into said pocket, and a cam adapted to be engaged by said depressible means to limit the movement thereof; said cam being adjustable whereby the movement of said depressible means may be varied to control the quantity of material forced into said pocket, substantially as specified.

31. In a machine of the class described, a hopper adapted to receive a plastic material and provided with a discharge outlet, a member provided with a pair of pockets adapted to be moved successively into and out of register with said discharge outlet, members movably positioned within said pockets and operatively connected to one another whereby as one of said members is moved inwardly the other thereof will be moved outwardly and vice versa, means for forcing the plastic material from said hopper into said pockets as they are successively brought into register with said discharge outlet, thereby causing the movable member within the pocket being filled to be moved inwardly and the movable member within the other of said pockets to be moved outwardly, whereby when the filled pocket is moved out of register with said discharge outlet inward movement of the outwardly positioned movable member will cause the inwardly positioned movable member to move outwardly to eject the material from its associated pocket, and means independent of said forcing means for moving the outwardly positioned member inwardly, substantially as specified.

32. In a machine of the class described, a hopper adapted to receive a plastic material and provided with a discharge outlet, a member provided with a pair of pockets adapted to be moved successively into and out of register with said discharge outlet, members movably positioned within said pockets and operatively connected to one another whereby as one of said members is moved inwardly the other thereof will be moved outwardly and vice versa, means for forcing the plastic material from said hopper into said pockets as they are successively brought into register with said discharge outlet, thereby causing the movable member within the pocket being filled to be moved inwardly and the movable member within the other of said pockets to be moved outwardly, whereby when the filled pocket is moved out of register with said discharge outlet inward movement of the outwardly positioned movable member will cause the inwardly positioned movable member to move outwardly to eject the material from its associated pocket, and means independent of said forcing means for moving the outwardly positioned member inwardly and then returning it to its outer position, substantially as specified.

33. In a machine of the class described, a hopper adapted to receive a plastic material and provided with a discharge outlet, a rotatable member provided with a pair of pockets adapted to be moved successively into and out of register with said discharge outlet, reciprocatable members positioned within said pockets and connected to one another, whereby as one of said members is moved inwardly the other thereof will be moved outwardly and vice versa, and means for forcing the plastic material from said hopper into said pockets as they are successively brought into register with said discharge outlet, thereby causing the reciprocatable member within the pocket being filled to be moved inwardly and the reciprocatable member within the other of said pockets to be moved outwardly, whereby when the filled pocket is moved out of register with said discharge outlet inward movement of the outwardly positioned reciprocatable member will cause the inwardly positioned reciprocatable member to move outwardly to eject the material from its associated pocket, substantially as specified.

34. In a machine of the class described, a hopper adapted to receive a plastic material and provided with a discharge outlet, a rotatable member provided with a plurality of pairs of pockets arranged in alternating relation to one another, means for intermittently rotating said member to move said pockets successively into and out of register with said discharge outlet, reciprocatable members positioned within said pockets, the reciprocatable members of each pair of pockets being connected to one another whereby inward movement of one of said members will cause outward movement of the member connected thereto and vice versa, and means for forcing the plastic material into said pockets as they are successively brought into register with said discharge outlet thereby causing the reciprocatable member within the pocket being filled to be moved inwardly and the reciprocatable member within the pocket which is paired therewith to be moved outwardly whereby when the filled pocket is moved out of register with said discharge outlet inward movement of the outwardly positioned reciprocatable member will cause the inwardly positioned reciprocatable member to move outwardly to eject the material from its associated pocket, substantially as specified.

35. In a machine of the class described, a hopper adapted to receive a plastic material and provided with a discharge outlet, a rotatable member provided with a plurality of pairs of pockets arranged in alternating relation to one another, means for intermittently rotating said member to move said pockets successively into and out of register with said discharge outlet, reciprocatable members positioned within said pockets, the reciprocatable members of each pair of pockets being connected to one another whereby inward movement of one of said members will cause outward movement of the member connected thereto and vice versa, means for forcing the plastic material into said pockets as they are successively brought into register with said discharge outlet thereby causing the reciprocatable member within the pocket being filled to be moved inwardly and the reciprocatable member within the pocket which is paired therewith to be moved outwardly, whereby when the filled pocket is moved out of register with said discharge outlet inward movement of the outwardly positioned reciprocatable member will cause the inwardly positioned reciprocatable member to move outwardly to eject the material from its associated pocket, and means for forcing the outwardly positioned reciprocatable member inwardly, substantially as specified.

36. In a machine of the class described, a hopper adapted to receive a plastic material and provided with a discharge outlet, a rotatable member provided with a plurality of pairs of pockets arranged in alternating relation to one another, means for intermittently rotating said member to move said pockets successively into and out of register with said discharge outlet, reciprocatable members positioned within said pockets, the reciprocatable members of each pair of pockets being connected to one another whereby inward movement of one of said members will cause outward movement of the member connected thereto and vice versa, means for forcing the plastic material into said pockets as they are successively brought into register with said discharge outlet thereby causing the reciprocatable member within the pocket being filled to be moved inwardly and the reciprocatable member within the pocket which is paired therewith to be moved outwardly, whereby when the filled pocket is moved out of register with said discharge outlet inward movement of the outwardly positioned reciprocatable member will cause the inwardly positioned reciprocatable member to move outwardly to eject the material from its associated pocket, and means for forcing the outwardly positioned reciprocatable member inwardly and then returning it to its outer position, substantially as specified.

37. In a machine of the class described, a hopper adapted to receive a plastic material and provided with a discharge outlet, a rotatable member provided with a plurality of pairs of pockets arranged in alternating relation to one another, means for intermittently rotating said member to move said pockets successively into and out of register with said discharge outlet, reciprocatable members positioned within said pockets, the reciprocatable members of each pair of pockets being connected to one another whereby inward movement of one of said members will cause outward movement of the member connected thereto and vice versa, means for forcing the plastic material into said pockets as they are successively brought into register with said discharge outlet thereby causing the reciprocatable member within the pocket being filled to be moved inwardly and the reciprocatable member within the pocket which is paired therewith to be moved outwardly, whereby when the filled pocket is moved out of register with said discharge outlet inward movement of the outwardly positioned reciprocatable member will cause the inwardly positioned reciprocatable member to move outwardly to eject the material from its associated pocket, and reciprocatable means for forcing the outwardly positioned reciprocatable member inwardly and then returning it to its outer position, substantially as specified.

38. In a machine of the class described, a hopper adapted to receive a plastic material and provided with a discharge outlet, a rotatable member provided with a plurality of pairs of pockets arranged in alternating relation to one another, means for intermittently rotating said member to move said pockets successively into and out of register with said discharge outlet, reciprocatable members positioned within said pockets, the reciprocatable members of each pair of pockets being connected to one another whereby inward movement of one of said members will cause outward movement of the members connected thereto and vice versa, means for forcing the plastic material into said pockets as they are successively brought into register with said discharge outlet thereby causing the reciprocatable member within the pocket being filled to be moved inwardly and the reciprocatable member within the pocket which is paired therewith to be moved outwardly whereby when the filled pocket is moved out of register with said discharge outlet inward movement of the outwardly positioned reciprocatable member will cause the inwardly positioned reciprocatable member to move outwardly to eject the material from its associated pocket, and means for successively forcing the outwardly positioned reciprocatable members inwardly, substantially as specified.

39. In a machine of the class described, a receptacle, a movable member provided with a plurality of pairs of pockets, means for introducing a plastic material into said pockets, means for moving said member to bring said pockets successively into register with said first-named means and with said receptacle, and means for forcing the material from a pocket of one of said pairs of pockets while the material is being introduced into a pocket of another of said pairs of pockets, substantially as specified.

40. In a machine of the class described, a hopper adapted to receive a plastic material and provided with a discharge outlet, a receptacle, a movable member provided with a plurality of pairs of pockets, means for moving said member to bring said pockets successively into register with said discharge outlet and with said receptacle, means for forcing the plastic material from said hopper into said pockets as they successively register with said discharge outlet, and means for forcing the material from a pocket of one of said pairs of pockets and into said receptacle while the material is being forced from said hopper into a pocket of another of said pairs of pockets, substantially as specified.

41. In a machine of the class described, a member provided with a pocket adapted to receive a plastic material, a second member provided with a receptacle, means for causing said pocket and said receptacle to register with one another, means for forcing the material from said pocket into said receptacle, and means for moving one of said members relative to the other of said members after the material has been forced from said pocket into said receptacle, to free the material from said forcing means, substantially as specified.

42. In a machine of the class described, a member provided with a pocket adapted to receive a plastic material, a second member provided with a receptacle, means for causing said pocket and said receptacle to register with one another, means for forcing the material from said pocket into said receptacle, and means for moving said second member relative to said first member after the material has been forced from said pocket into said receptacle to free the material from said forcing means, substantially as specified.

43. In a machine of the class described, a member provided with a pocket adapted to receive a plastic material, a rotatable member provided with a receptacle, means for rotating said rotatable member to cause said receptacle to register with said pocket, means for forcing the material from said pocket into said receptacle, and means for rotating said rotatable member relative to said first-mentioned member after the material has been forced from said pocket into said receptacle to free the material from said forcing means, substantially as specified.

44. In a machine of the class described, a member provided with a pocket adapted to receive a plastic material, a rotatable member provided with a receptacle, means for rotating said rotatable member to cause said receptacle to register with said pocket, means for forcing the material from said pocket into said receptacle, and means for rotating said rotatable member in the opposite direction relative to said first-mentioned member after the material has been forced from said pocket into said receptacle to free the material from said forcing means, substantially as specified.

45. In a machine of the class described, a rotatable member provided with a pocket adapted to receive a plastic material, a rotatable member provided with a receptacle, means for rotating said members to cause said receptacle to register with said pocket, means for forcing the material from said pocket into said receptacle, and means for rotating said second-mentioned member relative to said first mentioned member after the material has been forced from said pocket into said receptacle to free the material from said forcing means, substantially as specified.

46. In a machine of the class described, a member provided with a pocket adapted to receive a plastic material, a movable member provided with a receptacle, means for actuating said movable member to move said receptacle into and out of register with said pocket, means for forcing the material from said pocket into said receptacle, and means for moving said movable member relative to said first-mentioned member after the material has been forced from said pocket into said receptacle to free the material from said forcing means, substantially as specified.

47. In a machine of the class described, a member provided with a pocket adapted to receive a plastic material, a movable member provided with a receptacle, means for actuating said movable member to move said receptacle into and out of register with said pocket, means for forcing the material from said pocket into said receptacle, and means for moving said movable member relative to said first-mentioned member after the material has been forced from said pocket into said receptacle to free the material from said forcing means, said moving means operating before said receptacle is moved out of register with said pocket by said actuating means, substantially as specified.

48. In a machine of the class described, a member provided with a pocket adapted to receive a plastic material, a second member provided with a receptacle, means for causing said pocket and said receptacle to register with one another, means for forcing the material from said pocket into said receptacle, and cam actuated means for moving one of said members relative to the other of said members after the material has been forced from said pocket into said receptacle to free the material from said forcing means, substantially as specified.

49. In a machine of the class described, a member provided with a pocket adapted to receive a plastic material, a second member provided with a receptacle, means for causing said pocket and said receptacle to register with one another, means for forcing the material from said pocket into said receptacle, and means comprising a pawl and ratchet for moving one of said members relative to the other of said members after the material has been forced from said pocket into said receptacle to free the material from said forcing means, substantially as specified.

50. In a machine of the class described, a member provided with a pocket adapted to receive a plastic material, a second member provided with a receptacle, means for causing said pocket and said receptacle to register with one another, means for forcing the material from said pocket into said receptacle, and means comprising a cam actuated pawl and ratchet for moving one of said members relative to the other of said members after the material has been forced from said pocket into said receptacle to free the material from said forcing means, substantially as specified.

Signed at the city of New York, in the county and State of New York, this 6th day of March, one thousand nine hundred and seventeen.

FRANK M. PETERS.

Witnesses:
 Conrad A. Dieterich,
 L. F. Jackson.

Signed at Chicago, Cook County, in the State of Illinois, this 9th day of March, one thousand nine hundred and seventeen.

WARREN H. HUNGERFORD.

Witnesses:
 N. Hassett,
 Edmund P. Kelley.